US010012807B2

(12) United States Patent
Hoeltke et al.

(10) Patent No.: US 10,012,807 B2
(45) Date of Patent: Jul. 3, 2018

(54) DEVICE FOR COUPLING AND/OR DECOUPLING OPTICAL SIGNALS

(71) Applicant: SILICON LINE GMBH, Munich (DE)

(72) Inventors: Holger Hoeltke, Munich (DE); Martin Groepl, Sonthofen Oberallgaeu (DE)

(73) Assignee: Silicon Line GmbH, Munich (DE)

( * ) Notice: Subject to any disclaimer, the term of this patent is extended or adjusted under 35 U.S.C. 154(b) by 0 days.

(21) Appl. No.: 14/953,108

(22) Filed: Nov. 27, 2015

(65) Prior Publication Data
US 2016/0077291 A1 Mar. 17, 2016

Related U.S. Application Data

(63) Continuation of application No. PCT/DE2014/200243, filed on Jun. 2, 2014.

(30) Foreign Application Priority Data

May 31, 2013 (DE) ........................ 10 2013 105 650

(51) Int. Cl.
*G02B 6/42* (2006.01)
*G02B 6/30* (2006.01)

(52) U.S. Cl.
CPC .............. *G02B 6/423* (2013.01); *G02B 6/30* (2013.01); *G02B 6/4202* (2013.01); *G02B 6/428* (2013.01); *G02B 6/4274* (2013.01)

(58) Field of Classification Search
CPC ...... G02B 6/42; G02B 6/4257; G02B 6/4278; G02B 6/4284; H04B 10/40
See application file for complete search history.

(56) References Cited

U.S. PATENT DOCUMENTS 4,969,704 A 11/1990 Stanley
5,625,733 A 4/1997 Frigo et al.
(Continued)

FOREIGN PATENT DOCUMENTS

EP 0 292 328 A1 11/1988
EP 0 726 477 A2 8/1996
(Continued)

OTHER PUBLICATIONS

International Search Report issued in Application No. PCT/DE2014/200243, dated Oct. 30, 2014.

*Primary Examiner* — Ryan Lepisto
*Assistant Examiner* — Erin Chiem
(74) *Attorney, Agent, or Firm* — Studebaker & Brackett PC

(57) ABSTRACT

A device for coupling optical signals into at least one waveguide, wherein the device comprises at least one send-site circuit, which based on incoming signals from send-site terminal contacts actuates at least one electro-optical converter, which sends out the optical signals in the direction of the axis of the waveguide, in such a way that the manufacturing expenses are low. The electro-optical converter is incorporated, in particular embedded, in at least one send-site receptacle/alignment module, the send-site receptacle/alignment module comprises at least one groove- or trough-shaped depression for aligning the waveguide in relation to the electro-optical converter, and the send-site receptacle/alignment module is, in an essentially form-fit and/or force-fit manner, incorporated, in particular fitted, in a recess provided in a send-site substrate. The corresponding is true for a device for decoupling optical signals from at least one waveguide.

20 Claims, 4 Drawing Sheets

(56) References Cited

U.S. PATENT DOCUMENTS

| | | | |
|---|---|---|---|
| 6,256,448 B1* | 7/2001 | Shahid | G02B 6/3879 385/147 |
| 6,550,981 B1 | 4/2003 | Yamauchi | |
| 9,651,743 B2* | 5/2017 | Costello, III | G02B 6/3853 |
| 2001/0010744 A1* | 8/2001 | Shuto | G02B 6/4201 385/92 |
| 2001/0036344 A1 | 11/2001 | Steinberg et al. | |
| 2002/0102043 A1 | 8/2002 | Shin | |
| 2003/0012522 A1* | 1/2003 | Johnson | G02B 6/4239 385/91 |
| 2004/0120682 A1* | 6/2004 | Bhagavatula | G02B 6/3636 385/137 |
| 2005/0018969 A1 | 1/2005 | Deane | |
| 2007/0258680 A1 | 11/2007 | Nadeau et al. | |
| 2009/0285536 A1 | 11/2009 | Sakaki | |
| 2010/0118909 A1 | 5/2010 | Kuo et al. | |
| 2010/0129037 A1 | 5/2010 | Nakagawa et al. | |

FOREIGN PATENT DOCUMENTS

| | | |
|---|---|---|
| EP | 2 189 828 A1 | 5/2010 |
| GB | 2 356 066 A | 5/2001 |
| JP | 2002-232054 A | 8/2002 |
| WO | 97/11398 A1 | 3/1997 |
| WO | 02/42820 A1 | 5/2002 |
| WO | 02/093223 A1 | 11/2002 |

* cited by examiner

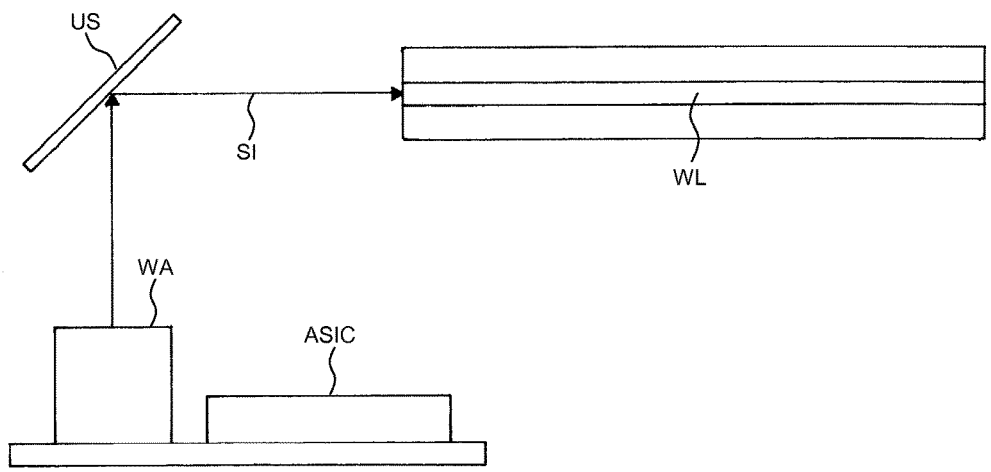
Fig. 1 (= Stand der Technik = prior art)
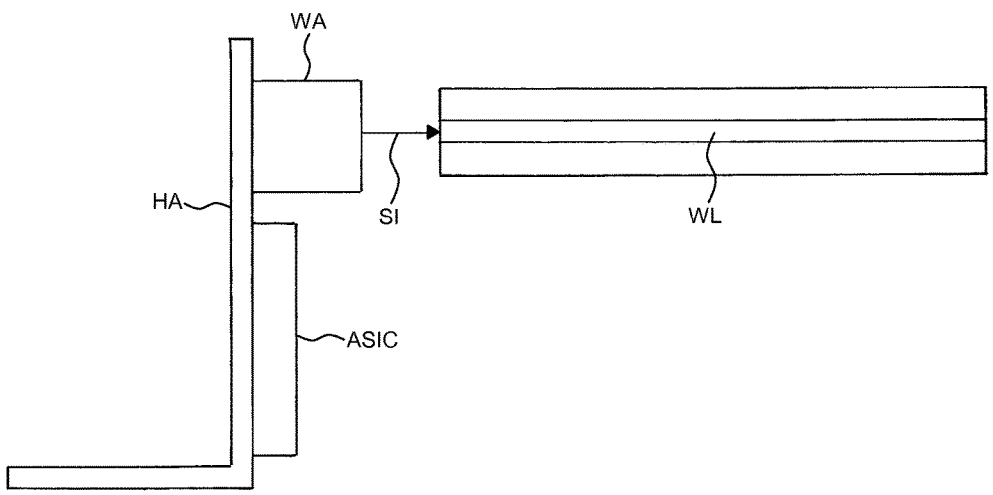
Fig. 2 (= Stand der Technik = prior art)

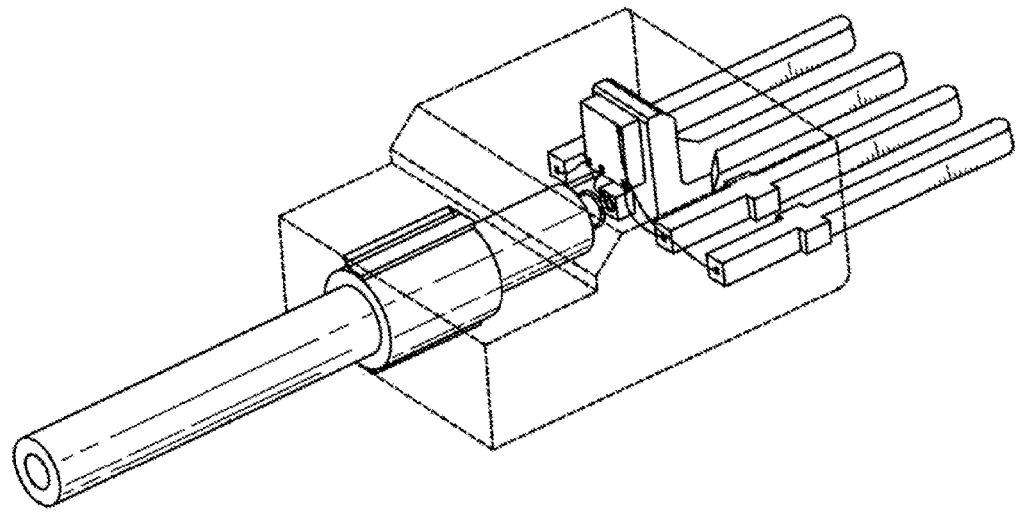
Fig. 3 (= Stand der Technik = prior art)
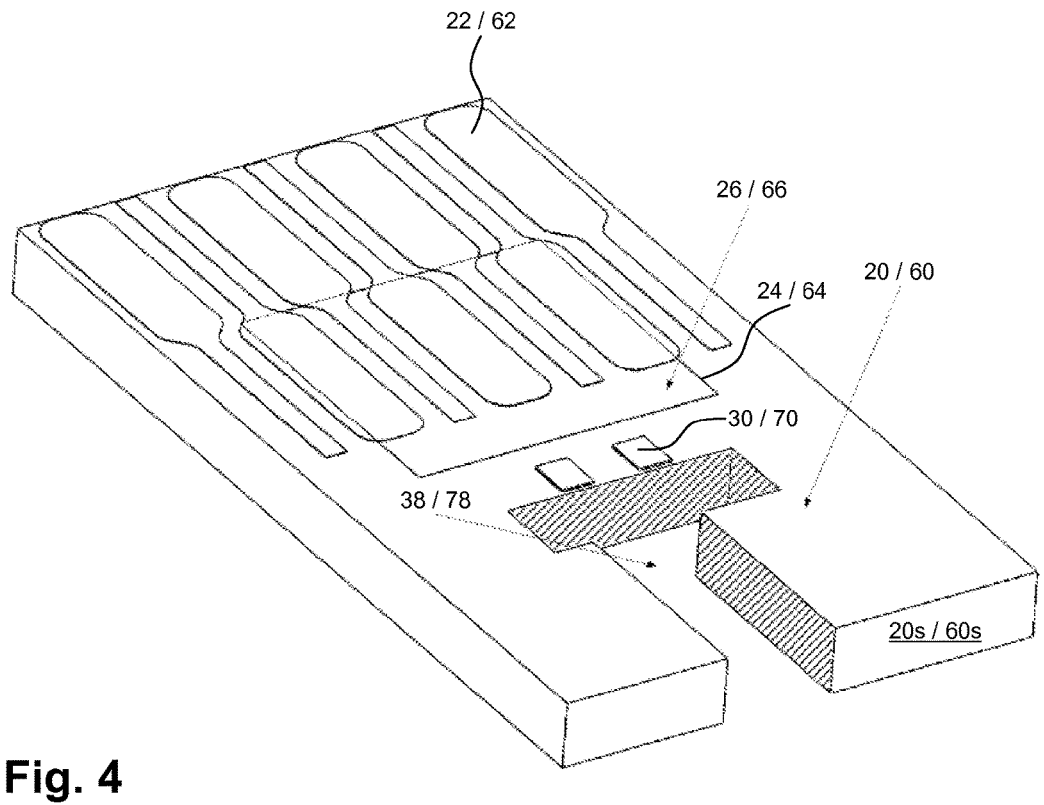
Fig. 4

DEVICE FOR COUPLING AND/OR DECOUPLING OPTICAL SIGNALS

CROSS-REFERENCE TO RELATED APPLICATIONS

This application is a continuation of international (WO) patent application no. PCT/DE2014/200243, filed 2 Jun. 2014, which claims the priority of German (DE) patent application no. DE 10 2013 105 650.4, filed 31 May 2013, the contents of each being hereby incorporated herein by reference.

FIELD OF THE INVENTION

The present invention relates to a device for coupling optical signals into at least one waveguide.

The present invention further relates to a complementary device for decoupling optical signals from at least one waveguide.

BACKGROUND OF THE INVENTION

As optical converters, in particular as active optical converters, vertical cavity surface emitting lasers (VCSEL) or photodiodes (PD) send or receive optical signals essentially perpendicular to their surface.

In order to couple such optical signals SI into an optical waveguide WL or decouple them from an optical waveguide WL, the optical signals SI are to be deflected by a 45 degree deflection mirror from the transmitting or receiving direction of the optical converter WA into a plane of the waveguide WL offset by ninety degrees, as may be taken from FIG. 1.

Publication DE 10 2012 005 618 A1 describes an active optical cable, whose fibers are materially bonded to an optical substrate. The fibers here become coupled with an integrated optical waveguide. A deflection element guides the free jet to the processing unit located on the substrate surface, wherein the free jet undergoes a directional change of ninety degrees, so as to direct the free jet into a transceiver unit.

Alternatively, optical converters WA can be arranged by means of a corresponding bracket HA in such a way that their transmitting or receiving direction corresponds to the plane of the waveguide WL, as may be taken from FIG. 2 and FIG. 3.

The disadvantage to the solutions known from prior art involves the frame size of the coupling and decoupling devices. This frame size and structural design make the known solutions unsuitable for the realization of applications involving the home and mobile electronics. This implies longer connection paths between the components, and thus longer latency periods.

In addition, the manufacturing expenses for the solutions known from prior art are high and cost-intensive.

OBJECTS AND SUMMARY OF THE INVENTION

Starting from the above-explained disadvantages and shortcomings as well as taking the outlined prior art into account, the object of the present invention is to further develop a coupling device of the above-mentioned type and a decoupling device of the above-mentioned type in such a way that a corresponding miniaturization of the coupling device and of the decoupling device is enabled at low optical losses; at the same time, the manufacturing expenses are to be low.

This object is achieved by a coupling device according to the present invention with the herein described features and by a decoupling device according to the present invention with the herein described features, in particular by a miniaturized and modularized active optical transmitting unit and/or a miniaturized and modularized active optical receiving unit. Advantageous embodiments and expedient further developments of the present invention are characterized in the respective dependent claims.

This object is achieved by a device for coupling optical signals into at least one waveguide, wherein the device comprises at least one send-site circuit, which based on incoming signals from send-site terminal contacts actuates at least one electro-optical converter, which sends out the optical signals in the direction of the axis of the waveguide,
  wherein the electro-optical converter is incorporated, in particular embedded, in at least one send-site receptacle/alignment module,
  wherein the send-site receptacle/alignment module comprises at least one groove- or trough-shaped depression for aligning the waveguide in relation to the electro-optical converter, and
  wherein the send-site receptacle/alignment module is, in an essentially form-fit and/or force-fit manner, incorporated, in particular fitted, in a recess provided in a send-site substrate.

This object is achieved by a device for decoupling optical signals from at least one waveguide in at least one opto-electrical converter, which receives the optical signals from the direction of the axis of the waveguide, and transmits them as electrical signals to at least one receive-site circuit, which processes the incoming electrical signals and outputs them to receive-site terminal contacts,
  wherein the opto-electrical converter is incorporated, in particular embedded, in at least one receive-site receptacle/alignment module,
  wherein the receive-site receptacle/alignment module comprises at least one groove- or trough-shaped depression for aligning the waveguide in relation to the opto-electrical converter, and
  wherein the receive-site receptacle/alignment module is, in an essentially form-fit and/or force-fit manner, incorporated, in particular fitted, in a recess provided in a receive-site substrate.

This object is further achieved by an embodiment according to the present invention wherein the waveguide is, relative to its cross section, incorporated at least partially into the depression, in particular recessed at least partially into the depression.

This object is further achieved by an embodiment according to the present invention wherein the depression is situated in an alignment part of the receptacle/alignment module extending in an axial direction of the waveguide.

This object is further achieved by an embodiment according to the present invention wherein the depression has a V-shaped design.

This object is further achieved by an embodiment according to the present invention wherein the receptacle/alignment module for receiving the converter comprises a receiving part that extends transverse, especially perpendicular, to the axial direction of the waveguide.

This object is further achieved by an embodiment according to the present invention wherein the end of the receptacle/alignment module facing away from the converter, in particular the end of the alignment part facing away from the converter, essentially abuts flush against the front face of the substrate.

This object is further achieved by an embodiment according to the present invention wherein the height of the receptacle/alignment module essentially abuts flush against the height of the substrate.

This object is further achieved by an embodiment according to the present invention wherein the receptacle/alignment module is made out of an optically transparent medium.

This object is further achieved by an embodiment according to the present invention wherein the receptacle/alignment module, in particular the receiving part, comprises at least one outlet provided between the converter and waveguide for the optical signals, in particular at least one drilled hole and/or at least one optically transparent medium.

This object is further achieved by an embodiment according to the present invention,
wherein the substrate comprises at least one contact, in particular at least one contact surface, and/or
wherein the receptacle/alignment module comprises at least one contact, in particular at least one contact surface,
for connecting the converter, wherein the contact of the substrate is allocated to the contact of the receptacle/alignment module.

This object is further achieved by an embodiment according to the present invention wherein the circuit is essentially arranged in the plane of the substrate comprising the terminal contacts.

This object is further achieved by an embodiment according to the present invention wherein the circuit is embedded in the substrate.

This object is further achieved by an embodiment according to the present invention,
wherein the electro-optical converter is at least one laser, in particular at least one vertical cavity surface emitting laser (VCSEL), and/or
wherein the opto-electrical converter is at least one diode, in particular at least one photodiode, and/or
wherein the circuit is at least one application-specific integrated circuit or at least one application-specific integrated circuit (ASIC), in particular at least one custom chip.

In the present invention, electrical signals received via electrical terminal contacts are processed in at least one circuit. The circuit, which can be designed as an application-specific integrated circuit or application-specific integrated circuit (ASIC), for example as a custom chip, actuates at least one electro-optical converter, in particular at least one laser, for example at least one vertical cavity surface emitting laser (VCSEL).

This electro-optical converter is incorporated or integrated, in particular embedded, in at least one send-site receptacle/alignment module, and axially transmits the converted optical signals in at least one waveguide, for example in at least one glass fiber.

The send-site receptacle/alignment module, which is, in an essentially form-fit and/or force-fit manner, incorporated, in particular fitted, into a recess provided in a send-site substrate, comprises at least one groove or channel-shaped depression, along which the waveguide can be aligned relative to the electro-optical converter.

The send-site receptacle/alignment module enables a modular construction, and in particular an alignment or fixation of the waveguide relative to the electro-optical converter. As a result, the dimensions of the send-site device according to the present invention can be reduced, wherein the modularization must also be regarded as very advantageous from a production and cost standpoint.

The substrate itself acts as a receiving medium not just for the send-site receptacle/alignment module, but also for the send-site circuit and send-site terminal contacts. In addition, the substrate has communication interfaces and electrical connections, so as to enable communication between the individual components.

On the reception side, the optical signals coming in through the waveguide are decoupled by at least one opto-electrical converter from the direction of the axis of the waveguide, in particular of the glass fiber.

This opto-electrical converter, which can be at least one diode, in particular at least one photodiode, is incorporated or integrated, in particular embedded, into at least one receive-site receptacle/alignment module, and converts the optical signals into electrical signals.

The converted electrical signals are output to at least one receive-site circuit, in particular to at least one application-specific integrated circuit or to at least one application-specific integrated circuit (ASIC), for example to at least one custom chip.

The receive-site circuit processes and, if necessary, amplifies the incoming electrical signals, if necessary also amplifies, and outputs these signals to receive-site terminal contacts.

The receive-site receptacle/alignment module, which is, in an essentially form-fit and/or force-fit manner, incorporated, in particular fitted, into a recess provided in a receive-site substrate, comprises at least one groove or channel-shaped depression, along which the waveguide can be aligned relative to the opto-electrical converter.

The receive-site receptacle/alignment module enables a modular construction, and in particular an alignment or fixation of the waveguide relative to the opto-electrical converter. As a result, the dimensions of the receive-site device according to the present invention can be reduced, wherein the modularization must also be regarded as very advantageous from a production and cost standpoint.

The substrate itself acts as a receiving medium not just for the receive-site receptacle/alignment module, but also for the receive-site circuit and receive-site terminal contacts. In addition, the substrate has communication interfaces and electrical connections, so as to enable communication between the individual components.

In a preferred embodiment of the present invention, the waveguide is, relative to its cross section, incorporated at least partially into the depression of the receptacle/alignment module, in particular recessed at least partially into the depression of the receptacle/alignment module. This allows the receptacle/alignment module to be especially effective in performing its alignment function for the waveguide.

The depression, for example with a V-shaped design, can advantageously be situated in an alignment part of the receptacle/alignment module extending in an axial direction of the waveguide. It is best for the depression to be provided laterally on the alignment part, enabling an especially space-saving fixation of the waveguide by having the interior wall of the recess in the substrate form the counterpart (which is not possible in conventional V-guide rails, which are arranged under the waveguide).

The depression is allocated to a partial area, in particular to a section, of the outer contour of the waveguide; in particular, the depression does not completely envelop the waveguide, but rather provides an alignment aid on one side of the waveguide.

The receptacle/alignment module can expediently comprise a receiving part for receiving the converter adjacent to this alignment part, in particular transverse to the end of the alignment part facing the converter, for example perpendicular to the end of the alignment part facing the converter.

In a preferred embodiment of the invention, the geometry of the in particular mechanical receptacle/alignment module can thus be T-shaped, in particular to ensure a form-fit and/or force-fit connection of the receptacle/alignment module with the substrate.

The receptacle/alignment module can here be fastened to the substrate acting as the complementary part or counterpart to the receptacle/alignment module by means of an adhesive bond and/or soldered bond and/or plug-and-socket connection and/or some other join connection.

In an advantageous further development of the present invention, the end of the receptacle/alignment module facing away from the converter, in particular the end of the alignment part facing away from the converter, can essentially abut flush against the front surface of the substrate.

Regardless of the above or in conjunction therewith, the height of the receptacle/alignment module can essentially abut flush against the height of the substrate, so as to ensure that the receptacle/alignment module is integrated the substrate as homogeneously as possible.

In an expedient embodiment of the present invention, the receptacle/alignment module can be made entirely out of an optically transparent medium. From a manufacturing standpoint, this variant is clearly more cost effective than a local, selective introduction of an optical medium into the receptacle/alignment module.

The receptacle/alignment module, in particular its receiving part, can expediently comprise at least one outlet provided between the converter and waveguide for the optical signals, in particular at least one drilled hole and/or at least one optically transparent medium.

In a preferred embodiment of the present invention,
the substrate comprises at least one contact, in particular at least one contact surface, and/or
the receptacle/alignment module comprises at least one contact, in particular at least one contact surface,
for connecting the converter, wherein the contact of the substrate can be allocated to the contact of the receptacle/alignment module.

For production and cost-related reasons, these contacts are preferably secured to the surface.

Such contacts can be expediently used to establish an electrical connection between the two components both on the substrate and on the receptacle/alignment module, for example in a wire bonding or soldering process, or by means of conductive adhesives, electronic spring contacts or in some similar way.

In an advantageous further development of the present invention, at least one contact surface is at least partially embedded in the substrate and/or in the receptacle/alignment module. This enables the fastening of components embedded in the substrate and/or in the receptacle/alignment module.

In this way, one end of the contacts can lie on the surface of the substrate and/or the receptacle/alignment module, in particular for connecting the substrate and receptacle/alignment module, and the other end can simultaneously be embedded in the substrate and/or in the receptacle/alignment module, so as to directly fasten embedded components. It is also conceivable that current and/or data transfer be contact-free, in particular inductive, in design.

In a preferred manner, the circuit and terminal contacts can be arranged in such a way as to essentially be located in one plane. This enables a reduction in the overall height, in particular if the circuit does not exceed the overall height of the substrate.

In an advantageous further development of the present invention, the circuit is embedded in the substrate, in particular adhesively bonded, soldered or inserted, so as to establish an especially close bond and attachment to the contacts, in particular those embedded in the substrate.

In an expedient embodiment of the present invention, the waveguide, in particular in the plane of the substrate, is aligned coaxially to a peripheral cable or peripheral contact that can be fastened to the terminal contacts. This can be significant in particular for the structural design of optically active cables.

In a preferred embodiment of the present invention, the device can comprise an enveloping housing, which can protect the device against external influences. This is important in particular for use as an optically active cable, especially since the housing can then be used as a plug with a mechanism for fixation on peripheral devices.

The proposed device for coupling or decoupling optical signals can be beneficially used in numerous areas of application, first and foremost for rapid signal transmission between two components with electrical signal routing.

The present invention thus relates above all to use in building, in particular pluggable, active optical cables for rapid and low-loss signal conversion, as well as data transmission over a very small space, so as to quickly relay the electrically processed data to the various units. The extremely short routing inside the device allows for very short latency periods.

According to the invention, modularization permits an extremely high degree of automation in the manufacturing process. The two components can be further processed separately due to the separate structural design of the substrate with ASIC and mechanical receptacle/alignment module with embedded electro-optical and/or opto-electrical converter, in particular with embedded electro-optical transmitter and/or with embedded opto-electrical receiver, and fixedly connected fibers.

For example, the substrate with ASIC can be fitted or wave soldered on a printed circuit board by machine in an automated "pick and place" process, during which the receptacle/alignment module with the most heat-sensitive fiber can be inserted or clicked in during a subsequent procedural step.

Also conceivable is use as a pluggable active optical cable, so as to connect peripheral devices, wherein the cable in the plug ends processes signals, converts signals, and couples and decouples the input and output signals.

It is here also possible to provide bidirectional cables, in particular if the transmitting and receiving components are integrated into a receptacle/alignment module, or directionally independent cables, if the electro-optical converter is simultaneously also an opto-electrical converter.

In addition, this device makes it possible to realize a new type of structural design for a miniaturized electro-optical transmitter and/or a miniaturized opto-electrical receiver with an optical waveguide fixedly connected with the receptacle/alignment module for transmitting electrical signals via such an optical waveguide.

The present invention is characterized by a high degree of miniaturization, which can be attributed to the way in which the components are positioned, modularized and integrated according to the invention. This makes it possible to construct A[ctive]O[ptical]C[able]s with miniaturized electro-optical transmitters and/or opto-electrical receivers.

By directly integrating the waveguide into the receptacle/alignment module, in particular by using transparent media for manufacturing the, in particular mechanical, receptacle/alignment module, very short signal connecting lengths can be achieved, for example bond wire lengths, which helps maintain signal quality and reduces latency periods, in particular given very high data transmission rates.

In like manner, modularization according to the present invention makes it possible to economize on the significant production costs, for example due to a higher degree of automation.

The above-disclosed circuit arrangement may work according to the above-disclosed method.

The present invention finally relates to the use of at least one coupling device according to the type presented hereinbefore and/or of at least one decoupling device according to the type presented hereinbefore for forming at least one, in particular pluggable, active optical cable.

BRIEF EXPLANATION OF THE DRAWINGS

As already discussed hereinbefore, there are various possibilities for embodying and further developing the teaching of the present invention in an advantageous manner. To this end, on the one hand reference is made to the explanations above and to the dependent claims, and on the other hand further embodiments, features and advantages of the present invention are explained in greater detail hereinafter, inter alia based upon the exemplary embodiment illustrated by FIG. 4 to FIG. 8.

It is shown in:

FIG. 1 a conceptual schematic view of a device according to the prior art, with which optical signals can be coupled at an angle of ninety degrees to the direction of emission;

FIG. 2 a conceptual schematic view of a device according to the prior art, with which optical signals can be coupled in an axial direction to the waveguide by means of an L-bracket;

FIG. 3 a perspective view of an example for realizing a coupling or decoupling device according to the prior art;

FIG. 4 a perspective view of an exemplary embodiment for a substrate, in particular for a carrier substrate, according to the present invention;

Figure 5:
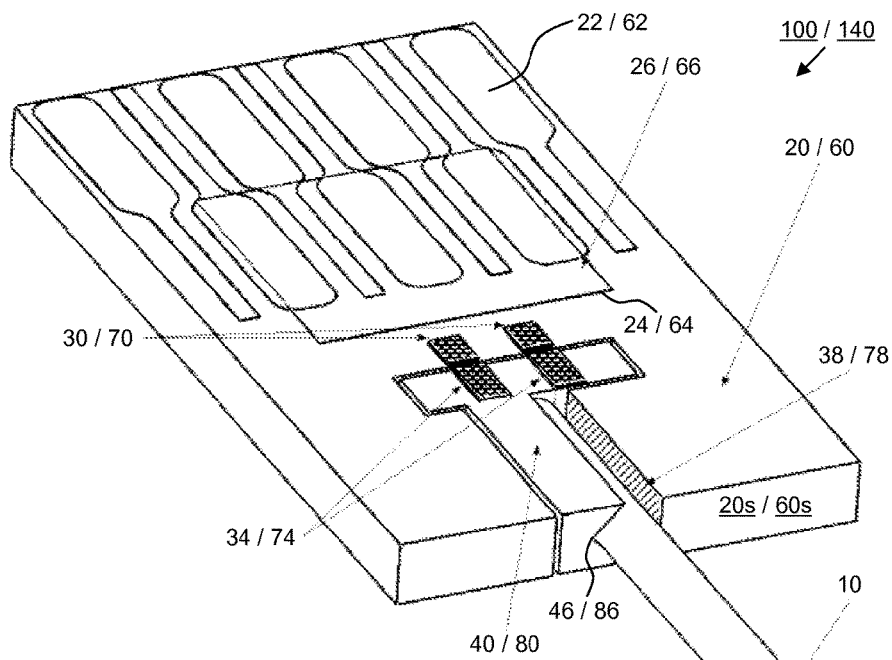
FIG. 5 a perspective view of an exemplary embodiment for a device according to the present invention formed with the substrate of FIG. 4.

Like or similar embodiments, elements or features are provided with identical reference numerals in FIG. 4 to FIG. 8. While no graphic distinction is made between the transmission side and reception side, the receive-site elements corresponding to the send-site elements have a reference numeral that is higher by 40.

DETAILED DESCRIPTION OF THE INVENTION

The send-site layout on FIG. 5 presents a device 100 for coupling optical signals into a waveguide 10. The device 100 comprises a send-site circuit 26, which based on incoming signals from send-site terminal contacts 22 actuates an electro-optical converter 28, which sends out the optical signals in the direction of the axis 12 of the waveguide 10.

The receive-site layout on FIG. 5 presents a device 140 for decoupling optical signals from at least one waveguide 10 in an opto-electrical converter 68, which receives the optical signals from the direction of the axis 12 of the waveguide 10, and transmits them as electrical signals to a reception side circuit 66, which processes the incoming electrical signals and outputs them to receive-site terminal contacts 62.

The invention provides a send-site substrate 20 or a receive-site substrate 60 (cf. FIG. 4). The terminal contacts 22 or 62, which in particular can be metal pressure contacts or sliding contacts, are supported on the substrate 20 or 60, wherein the latter can also be worked, for example infused, into the substrate 20 or 60.

The substrate 20 or 60 on FIG. 4 and FIG. 5 comprises a notch 24 or 64, which has dimensions roughly corresponding to those of the ASIC 26 or 66 (=application-specific integrated circuit or application-specific integrated circuit, also referred to as custom chip). The ASIC 26 or 66 is required by the electro-optical converter 28 or by the opto-electrical converter 68 for the respective signal processing.

The circuit 26 or 66 is integrated into the notch 24 or 64, preferably adhesively bonded or inserted, wherein the height of the substrate 20 or 60 corresponds to about the height of the circuit 26 or 66.

The circuit 26 or 66 can here at least partially itself also be designed with the terminal contacts 22 or 62, as may be taken from FIG. 4 and FIG. 5.

The side of the substrate 20 or 60 facing an optical waveguide 10 comprises a recess 38 or 78, the dimensions of which roughly correspond to those of a receptacle/alignment module 40 or 80. The converter 28 or 68 is allocated to this receptacle/alignment module 40 to 80, in particular incorporated or integrated therein, for example embedded therein.

The direction of emission or reception of the converter 28 or 68 is here essentially parallel to a groove- or trough-shaped, in particular V-shaped, lateral depression 46 or 86 provided in the receptacle/alignment module 40 or 80, which can be used to align the waveguide 10 in relation to the converter 28 or 68.

The receptacle/alignment module 40 or 80 is made out of optically transparent material that can absorb mechanical loads, and is, in an essentially form-fit and/or force-fit manner, incorporated, in particular fitted, in the recess 38 or 78 provided in the substrate 20 or 60.

Figure 6:
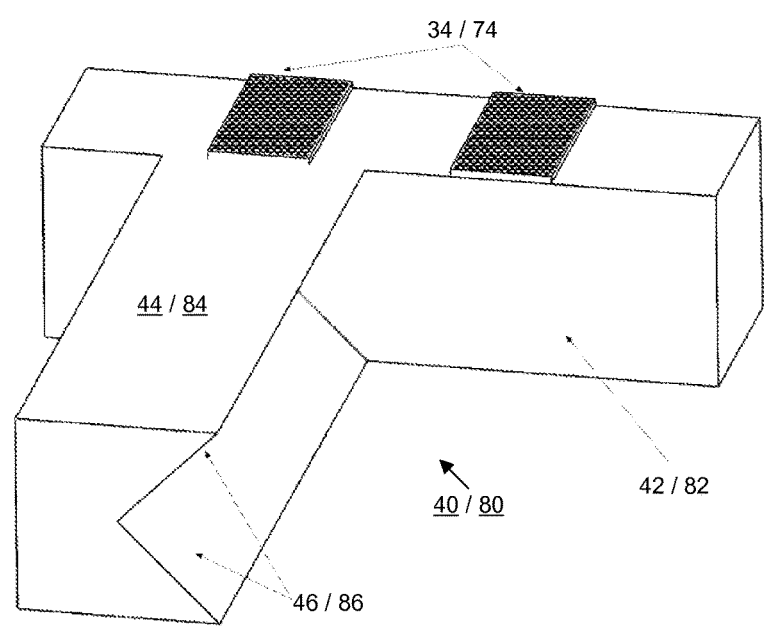
FIG. 6 a perspective view of an exemplary embodiment for a receptacle/alignment module according to the present invention, which is part of the device of FIG. 5.

Located on the surface of the substrate 20 or 60 are contact surfaces 30 or 70, which in particular can be metal pressure contacts or sliding contacts, so that the components lying in the substrate 20 or 60, in particular the converter 28 or 68, can communicate with the components in the receptacle/alignment module 40 or 80, to which end the receptacle/alignment module 40 or 80 comprises contact surfaces 34 or 74, in particular pressure contacts or sliding contacts, that correspond with the contact surfaces 30 or 70 of the substrate 20 or 60 (cf. FIG. 5 and FIG. 6).

FIG. 5 shows that the receptacle/alignment module 40 or 80 can be allocated flush to the front face 20s or 60s of the substrate 20 or 60. The receptacle/alignment module 40 or 80 here lies in a plane with the circuit 26 and 66 and with the terminal contacts 22 and 62 and comprises an approximately T-shaped geometry for force-fit integration into the substrate 20 or 60, while being comprised of:

an alignment part 44 or 84 extending in an axial direction of the waveguide 10 with a laterally integrated or laterally molded or laterally mounted V-shaped depression 46 or 86 and a reception part 42 or 82 extending transverse, especially perpendicular, to the axial direction of the waveguide 10 for receiving the converter 28 or 68

(cf. FIG. 5, FIG. 6, FIG. 7 and FIG. 8).

Figure 8:
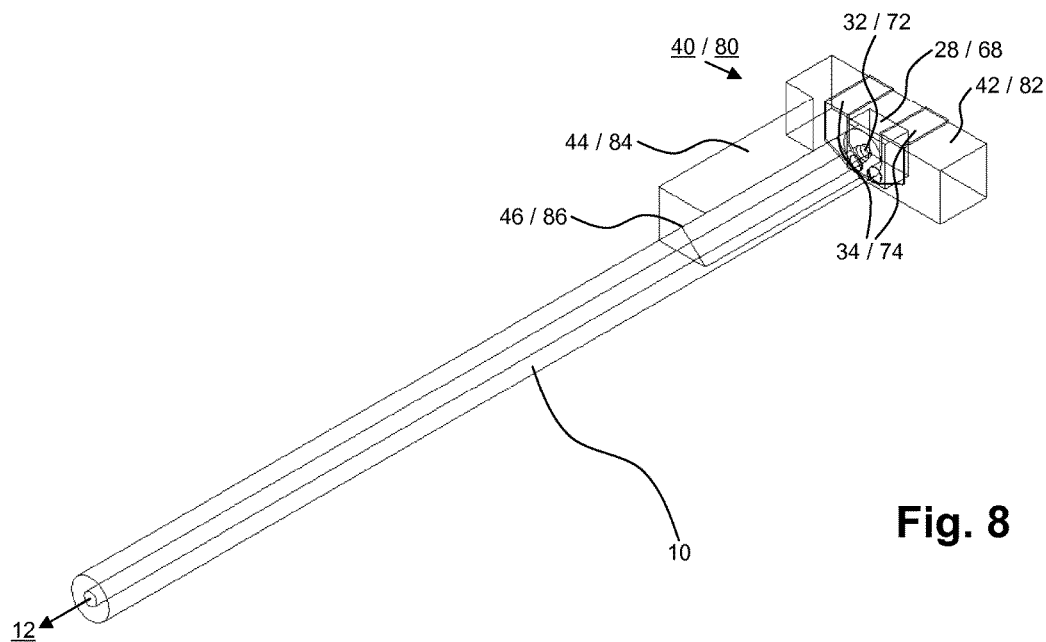
FIG. 8 a perspective view of the receptacle/alignment module of FIG. 7 with allocated converter.

As may be taken from the illustration on FIG. 5 and FIG. 8, the depression 46 or 86 is allocated to a partial area, in particular to a section, of the outer contour of the waveguide 10; in particular, the depression 46 or 86 does not envelop the waveguide 10 completely, but rather only provides an alignment aid on one side of the waveguide 10, wherein the counterpart is formed on the other side of the waveguide 10 by the inner wall of the recess 38 or 78 in the substrate 20 or 60.

Figure 7:
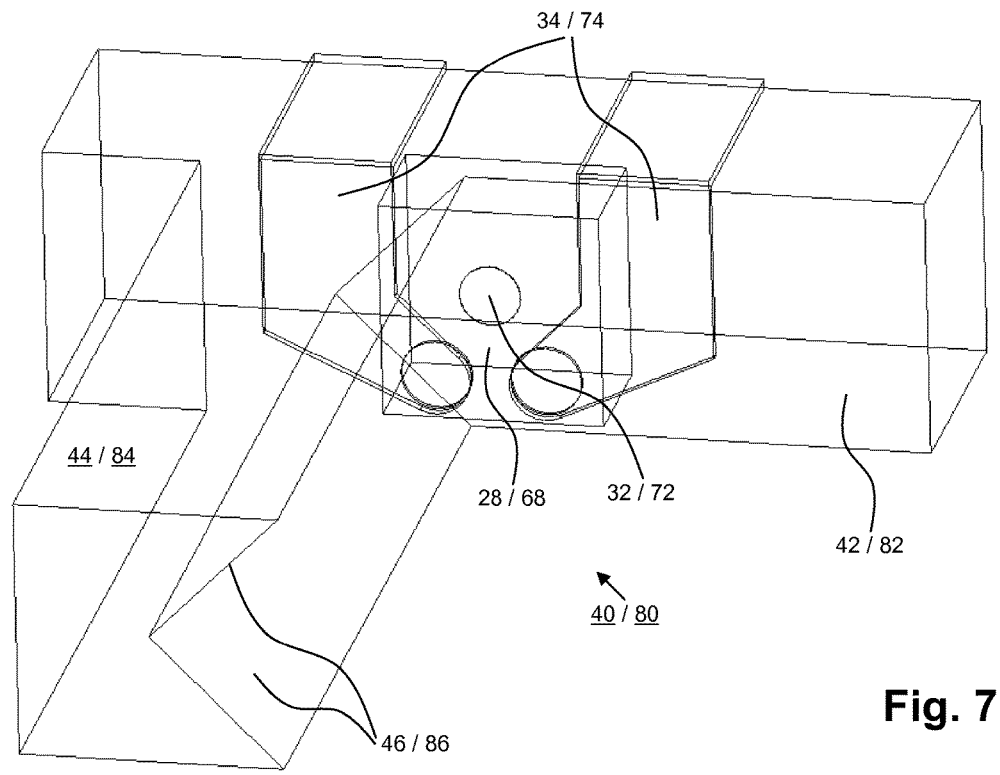
FIG. 7 a perspective view of the receptacle/alignment module of FIG. 6 with integrated converter.

As may be taken from the illustration on FIG. 7 and FIG. 8, the reception part 42 or 82 of the receptacle/alignment module 40 or 80 comprises an outlet 32 or 72 provided between the converter 28 or 68 and the waveguide 10.

This outlet 32 or 72 is thus located in front of the opening of the converter 28 and 68, and is designed as a drilled hole and/or as an optically transparent medium, in particular as a transparent material, for the optical signals.

FIG. 8 shows the receptacle/alignment module 40 or 80 with allocated waveguide 10 composed of glass fiber, which is partially incorporated, in particular recessed, into the depression 46 or 86 through adhesive bonding, welding (fusing), clinching or joining in some other way.

LIST OF REFERENCE NUMERALS

10 waveguide
12 axial direction of waveguide 10
20 send-site substrate, in particular send-site printed circuit board
20s front face of send-site substrate 20
22 send-site terminal contact
24 send-site notch for incorporating send-site circuit 26
26 send-site circuit, in particular send-site application-specific integrated circuit or send-site application-specific integrated circuit (ASIC), for example send-site custom chip
28 electro-optical converter, in particular active optical transmission unit
30 contact, in particular contact surface, of the send-site substrate 20
32 send-site outlet, in particular drilled hole and/or transparent medium for optical signals
34 contact, in particular contact surface, of the send-site receptacle/alignment module 40
38 recess in the send-site substrate 20
40 send-site receptacle/alignment module
42 receptacle part of the send-site receptacle/alignment module 40
44 alignment part of the send-site receptacle/alignment module 40
46 depression in the send-site alignment part 44
60 receive-site substrate, in particular receive-site printed circuit board
60s front face of the send-site substrate 20
62 receive-site terminal contact
64 receive-site notch for incorporating the receive-site circuit 66
66 receive-site circuit, in particular receive-site application-specific integrated circuit or receive-site application-specific integrated circuit (ASIC), for example receive-site custom chip
38 opto-electrical converter, in particular active optical reception unit
70 contact, in particular contact surface, of the receive-site substrate 60
72 receive-site outlet, in particular drilled hole and/or transparent medium for optical signals
74 contact, in particular contact surface, of the receive-site receptacle/alignment module 80
78 recess in the receive-site substrate 60
80 receive-site receptacle/alignment module
82 receptacle part of the receive-site receptacle/alignment module 80
84 alignment part of the receive-site receptacle/alignment module 80
86 depression in the receive-site alignment part 84
100 send-site device
140 receive-site device
ASIC circuit, in particular application-specific integrated circuit or application-specific integrated circuit (ASIC), for example custom chip (=prior art; cf. FIG. 1 and FIG. 2)
HA bracket (=prior art; cf. FIG. 2)
SI optical signal (=prior art; cf. FIG. 1 and FIG. 2)
US deflection mirror (=prior art; cf. FIG. 1)
WA optical converter (=prior art; cf. FIG. 1 and FIG. 2)
WL optical waveguide (=prior art; cf. FIG. 1 and FIG. 2)

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A device for coupling optical signals into at least one waveguide, wherein the device comprises:
    at least one electro-optical converter; and
    at least one send-site circuit,
        wherein the send-side circuit based on incoming signals from send-site terminal contacts actuates the electro-optical converter, which sends out the optical signals in the direction of an axis of the waveguide,
        wherein the electro-optical converter is incorporated in at least one send-site receptacle/alignment module,
        wherein the send-site receptacle/alignment module comprises at least one groove- or trough-shaped depression for aligning the waveguide in relation to the electro-optical converter,
        wherein the send-site receptacle/alignment module is, in an essentially form-fit or force-fit manner, incorporated in a recess provided in a send-site substrate,
        wherein the recess extends from an upper portion of the send-site substrate to a lower portion of the send-site substrate and exposes a lateral portion of the send-site substrate therebetween,
        wherein the send-site receptacle/alignment module comprises an alignment part extending in an axial direction of the waveguide,
        wherein the alignment part comprises an upper portion, a lower portion, and a lateral portion therebetween, and wherein the at least one groove- or trough-shaped depression is formed in the lateral portion of the alignment part so as to face the lateral portion of the send-site substrate.

2. The device according to claim 1, wherein the waveguide is, relative to its cross section, incorporated at least partially into the depression.

3. The device according to claim 1, wherein the depression
has a V-shaped design.

4. The device according to claim 1, wherein the send-site receptacle/alignment module for receiving the electro-optical converter comprises a receiving part that extends transverse to the axial direction of the waveguide.

5. The device according to claim 1,
wherein an end of the send-site receptacle/alignment module facing away from the electro-optical converter essentially abuts flush against a front face of the send-site substrate, or
wherein a height of the send-site receptacle/alignment module essentially abuts flush against a height of the send-site substrate.

6. The device according to claim 1, wherein the send-site receptacle/alignment module
is made out of an optically transparent medium, or
comprises at least one outlet provided between the electro-optical converter and the waveguide for the optical signals.

7. The device according to claim 1,
wherein the send-site substrate comprises at least one contact or
wherein the send-site receptacle/alignment module comprises at least one contact,
for connecting the electro-optical converter, wherein the contact of the send-site substrate is allocated to the contact of the send-site receptacle/alignment module.

8. The device according to claim 1, wherein the send-site circuit
is essentially arranged in a plane of the send-site substrate comprising the send-site terminal contacts, or
is embedded in the send-site substrate.

9. The device according to claim 1,
wherein the electro-optical converter is at least one laser, or
wherein the send-site circuit is at least one application-specific integrated circuit or at least one application-specific integrated circuit (ASIC).

10. Use of at least one device according to claim 1 for forming at least one active optical cable.

11. A device for decoupling optical signals from at least one waveguide, wherein the device comprises:
at least one opto-electrical converter; and
at least one receive-site circuit,
wherein the opto-electrical converter receives the optical signals from the direction of an axis of the waveguide, and transmits them as electrical signals to the receive-site circuit, which processes the incoming electrical signals and outputs them to receive-site terminal contacts,
wherein the opto-electrical converter is incorporated in at least one receive-site receptacle/alignment module,
wherein the receive-site receptacle/alignment module comprises at least one groove- or trough-shaped depression for aligning the waveguide in relation to the opto-electrical converter, wherein the receive-site receptacle/alignment module is, in an essentially form-fit or force-fit manner, incorporated in a recess provided in a receive-site substrate,
wherein the recess extends from an upper portion of the receive-site substrate to a lower portion of the receive-site substrate and exposes a lateral portion of the receive-site substrate therebetween,
wherein the receive-site receptacle/alignment module comprises an alignment part extending in an axial direction of the waveguide,
wherein the alignment part comprises an upper portion, a lower portion, and a lateral portion therebetween, and
wherein the at least one groove- or trough-shaped depression is formed in the lateral portion of the alignment part so as to face the lateral portion of the receive-site substrate.

12. The device according to claim 11, wherein the waveguide is, relative to its cross section, incorporated at least partially into the depression.

13. The device according to claim 11, wherein the depression
has a V-shaped design.

14. The device according to claim 11, wherein the receive-site receptacle/alignment module for receiving the opto-electrical converter comprises a receiving part that extends transverse to the axial direction of the waveguide.

15. The device according to claim 11,
wherein an end of the receive-site receptacle/alignment module facing away from the opto-electrical converter essentially abuts flush against a front face of the receive-site substrate, or
wherein a height of the receive-site receptacle/alignment module essentially abuts flush against a height of the receive-site substrate.

16. The device according to claim 11, wherein the receive-site receptacle/alignment module
is made out of an optically transparent medium, or
comprises at least one outlet provided between the opto-electrical converter and the waveguide for the optical signals.

17. The device according to claim 11,
wherein the receive-site substrate comprises at least one contact or
wherein the receive-site receptacle/alignment module comprises at least one contact,
for connecting the opto-electrical converter, wherein the contact of the receive-site substrate is allocated to the contact of the receive-site receptacle/alignment module.

18. The device according to claim 11, wherein the receive-site circuit
is essentially arranged in a plane of the receive-site substrate comprising the receive-site terminal contacts or
is embedded in the receive-site substrate.

19. The device according to claim 11,
wherein the opto-electrical converter is at least one diode, or
wherein the receive-site circuit is at least one application-specific integrated circuit or at least one application-specific integrated circuit (ASIC).

20. Use of at least one device according to claim 11 for forming at least one active optical cable.

* * * * *